July 20, 1965
R. H. BENNETT
3,196,400
REMOTE CONTROL OF SELECTOR SWITCHES
Filed Jan. 15, 1962
2 Sheets-Sheet 1
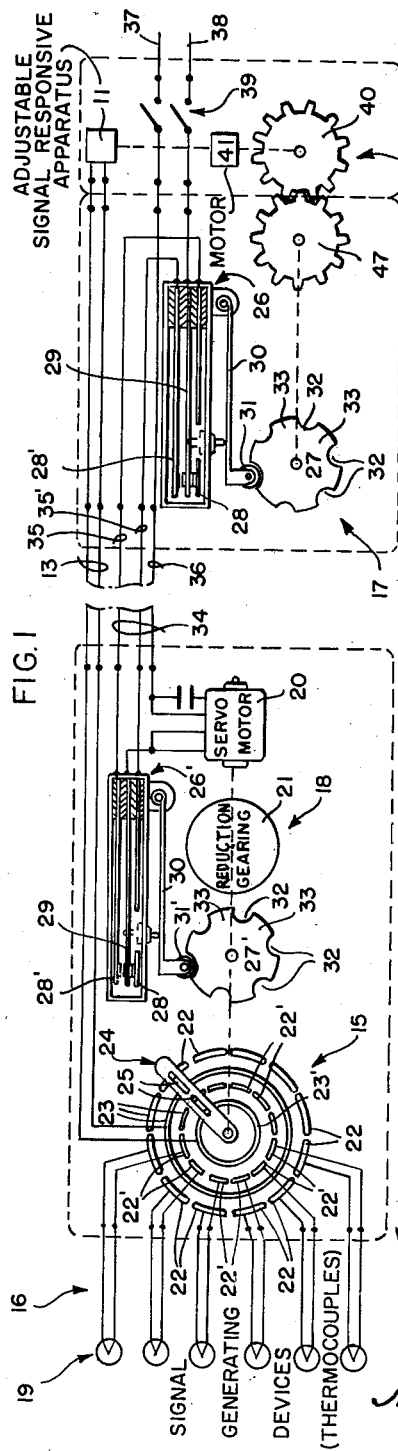
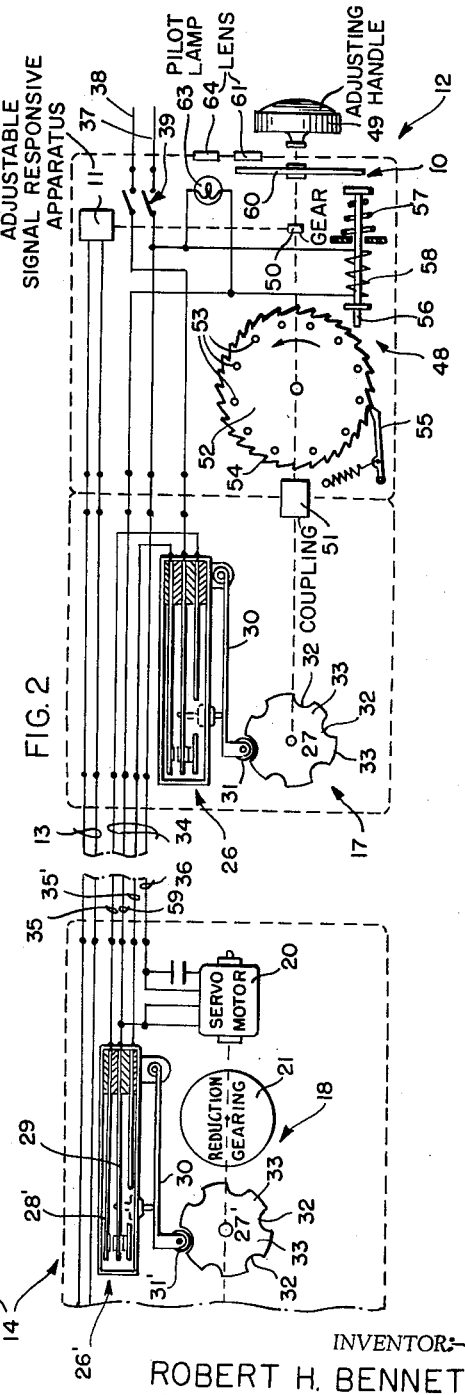
INVENTOR:—
ROBERT H. BENNETT
BY:—
Marzall, Johnston, Cook & Root
ATT'YS July 20, 1965 R. H. BENNETT 3,196,400
REMOTE CONTROL OF SELECTOR SWITCHES
Filed Jan. 15, 1962 2 Sheets-Sheet 2
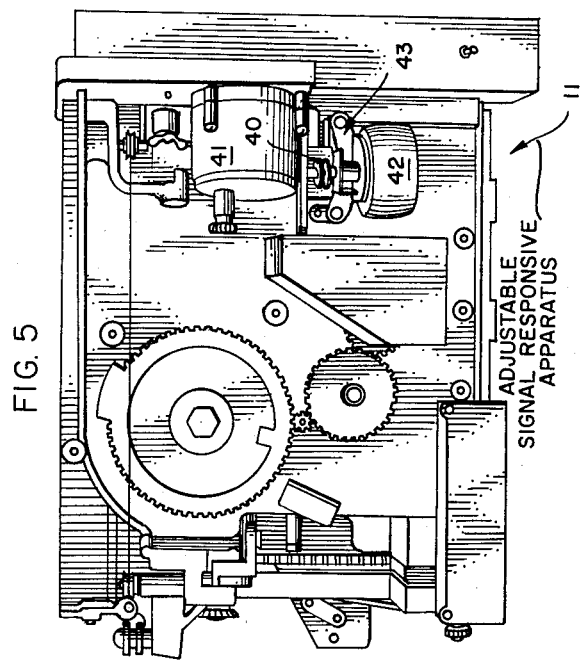
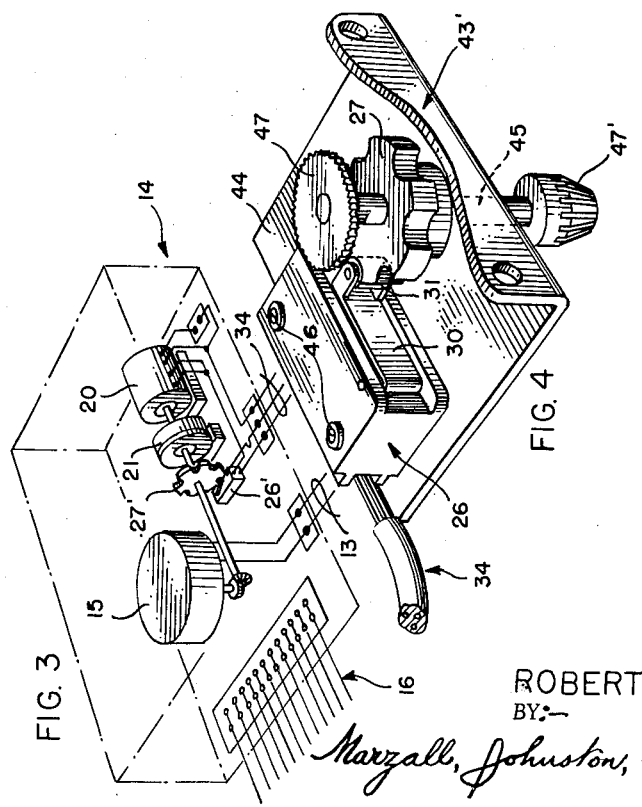
INVENTOR:—
ROBERT H. BENNETT
BY:—
Marzall, Johnston, Cook & Root
ATT'YS

United States Patent Office 3,196,400
Patented July 20, 1965

3,196,400
REMOTE CONTROL OF SELECTOR SWITCHES
Robert H. Bennett, 8614 Walnut Drive, Munster, Ind.
Filed Jan. 15, 1962, Ser. No. 166,309
12 Claims. (Cl. 340—151)

The present invention relates in general to the control of remotely located electrical equipment, such as switching mechanism, from a central monitoring station, and has more particular reference to the control of remotely located switching mechanism employed for telemetering purposes, as by operating the switching mechanism as a slave, to selectively interconnect metering devices with a single communication circuit or channel, in response to the operation of a master control mechanism located at the monitoring station; the invention specifically pertaining to a system operable to transmit a number of remotely produced metering signals in succession over a single communication channel for delivery at a central monitoring station.

The general object of the present invention is to provide improved and simplified apparatus for delivering signals produced by a plurality of remotely located electrical metering devices, such as thermocouples, in succession through a single transmission channel, such as a telephone, telegraph, or other communication line or channel, to a central monitoring station, where the several signals may be applied to any preferred or conventional indicating, recording, or other signal processing apparatus.

Though not necessarily limited to such application, the invention is particularly well adapted to be applied for use in installations requiring temperature measurement at several measuring stations, as by means of thermocouples, the temperature responses of which may be indicated or recorded by connecting the same with an appropriate indicating or recording meter; and the present invention has for an important object the provision of simple, yet reliable means, located at a central switching station, for successively interconnecting the several thermocouples with a single transmission channel under the control of master switch actuating means located at a monitoring station, remote from the switching station, whereby signals, comprising the thermal responses of the thermocouples, may be transmitted to and indicated or recorded by appropriate multiple signal indicating or recording apparatus located at the monitoring station, under the control of the master switch actuating mechanism.

Another important object is to provide simplified master-slave apparatus for the synchronous or contemporaneous actuation of progressively operable mechanisms, respectively located at a monitoring station and at a remote switching station, so that remotely located measuring devices may be connected with a single transmission line at the switching station concurrently with the corresponding connection of the transmission line with a corresponding phase of multiple signal indicating or recordng mechanism located at the monitoring station.

Briefly stated, the objects of the present invention may be realized by the provision of apparatus comprising a rotary switch located at a central switching station and operable to successively connect thermocouple lead wire pairs with a transmission line or channel extending from the connection station to a remote receiving station for the operation of multiple signal responsive indicating or recording apparatus at said station, and a servo-motor connected to drive the rotary switch and a position determining cam at the switching station, the cam in turn being drivingly connected to actuate a single-pole, double-throw servo-motor control switch in step with the movement of the rotary switch through its successive switching positions, means being provided for electrically interconnecting the servo-motor and switch at the switching station with complementary control means and a power source located at the remote recording station, such complementary control means including a counterpart single-pole double-throw switch and switch actuating cam driven in step with the multiple signal responsive apparatus, the single-pole, double-throw servo-motor control switch and its associated motor driven cam located at the switching station forming slave apparatus adapted to move in step with the counterpart mechanism at the central recording or monitoring station.

At the monitoring station, the switch controlling cam may be drivingly connected to turn in synchronism with signal responsive indicating or recording apparatus, which, in turn, may be driven in any preferred or conventional fashion, as by manually or motor actuated driving means. As a consequence, as the indicating or recording mechanism at the monitoring station is successively adjusted to its several signal receiving positions, the remotely located rotary switch will be operated under the control of the master-slave motor controlling switches and cams, to connect the corresponding signal producing devices with the transmission line or channel, whereby the multiple signal responsive apparatus, when in each of its adjusted signal receiving positions, will react to a signal transmitted from the signal producing device which corresponds with the adjusted position of the signal responsive apparatus.

The foregoing and numerous other important objects, advantages and inherent functions of the invention will become apparent as the same is more fully understood from the following description, which, taken in connectio with the accompanying drawings, discloses a preferred embodiment of the invention.

Referring to the drawings:

FIG. 1 is a diagrammatic view illustrating a remote control system embodying the present invention;

FIG. 2 is a diagrammatic view illustrating a modified or alternative arrangement embodying the invention;

FIG. 3 is a perspective view showing a portion of the apparatus illustrated diagrammatically in FIG. 1;

FIG. 4 is a perspective view illustrating an assembly unit forming another portion of the apparatus shown in FIG. 1; and FIG. 5 is a rear view of a conventional signal recording apparatus, as manufactured by the Brown Instrument Company of Philadelphia, Pennsylvania, with which the assembly unit shown in FIG. 4 may be drivingly connected in accordance with an aspect of the present invention.

To illustrate the invention the drawings show multiple signal responsive apparatus 11 adapted to indicate or record data applied thereon in the form of signal impulses, the apparatus being of the sort adapted for adjustment to accept and to record or indicate a number of signals, in succession, as by operation of manually or motor driven adjusting means 10. For example, the responsive apparatus 11 may comprise a conventional recording mechanism embodying a plurality of recording oscillographs and rotary switch means for successively connecting the oscillographs with the signal input terminals of the apparatus, whereby to actuate the oscillographs successively in response to signals applied at the input terminals.

The present invention contemplates the employment of any suitable, preferred or conventional means forming a signal transmission channel for applying, upon the input terminals of the apparatus 11, signals emitted or produced at locations disposed remotely from the receiving station 12. To this end, the input terminals of the apparatus 11 may be connected with any suitable or preferred signal transmission channel, which, as shown in FIGS. 1 and 2, may comprise a pair of conductors 13 connected with the input terminals of the mechanism 11 and extending thence to switching apparatus at a remotely located connection station 14 where any suitable, preferred or conventional switching means 15 may be employed for connecting a plurality of signaling circuits 16 successively with the transmission line 13. Master control means 17, located at the central station 12, and drivingly associated with the adjusting means 10, and controllingly connected with switch operating sleeve mechanism 18, at the remote switching station 14, is provided for actuating the sequential switching means 15 in synchronism with the adjustment of the apparatus 11 for the reception of signals to be successively indicated or recorded.

The signaling circuits 16 may each connect with a corresponding signal generating device 19 such, for example, as a thermocouple, responsive to temperatures to be measured at diverse locations in the general vicinity of the connection station 14. For example, it is highly desirable, if not essential, to maintain constant monitoring supervision of the temperatures prevailing in the several distilling, condensing, and other treatment components employed in an oil refinery; and thermocouples, appropriately mounted at the places where a determination of prevailing temperature is desired, may be employed for the performance of such desirable monitoring function. Such monitoring thermocouples may be connected as signaling devices, each in a corresponding one of the signaling circuits 16, so that a record of the response of each thermocouple may be made at the central station 12.

The switching means 15 may comprise any suitable, preferred or conventional rotary switch drivingly connected with a servo-motor 20, as through suitable speed reducing gear means 21. As shown, the rotary switch may comprise a set of circularly arranged commutator segments 22 and a corresponding set of segments 22' in concentric registration each with a corresponding one of the segments 22. The switch may also comprise contact rings 23 and 23', respectively concentric with respect to the sets of segments 22 and 22'. As shown, the switch also comprises a rotary arm 24 drivingly connected with the servo-motor 20 through the gear means 21, said arm containing a pair of bridging contacts 25 disposed in position to connect the contact rings 23 and 23' respectively and successively with the segments 22 and 22', the circuits 16 being each connected with a corresponding pair of segments 22 and 22', and the rings 23 and 23' being connected with the conductors 13 of the transmission line. Accordingly, as the arm 24 is rotated, the segment connected circuits 16 will be successively connected with the transmission line 13 and hence with the input terminals of the signal responsive apparatus 11.

In order to move the shiftable switch member 24 in unison with the adjustment of the signal responsive apparatus 11, a pair of preferably identical single-pole, double-throw switches 26 and 26' and preferably identical cooperating switch actuating cams 27 and 27' are provided, the switch 26 and its cooperating cam 27 being disposed at the receiving station 12 while the switch 26' and its associated cam 27' is mounted at the remote switching station 14. The switches 26 and 26' each comprise a pair of spaced apart contact elements 28 and 28' and a blade element 29 adapted to make electrical connection alternately with the contact elements 28 and 28', said blade element being normally biased to electrically connect with the element 28. Both switches may include a switch actuating arm 30 movable to shift the switch blade element 29 from engagement with the contact element 28 and into engagement with the contact element 28'. To this end, the switch actuating arms 30 of the switches 26 and 26' may be respectively provided with cam following rollers 31 and 31' in position to engage with the cams 27 and 27'.

The cams 27 and 27', as shown, comprise disks which are drivingly connected, respectively, to turn in unison with the apparatus adjusting means 10 and the switching means 15; and the peripheries of the cam disks are formed to provide circumferentially spaced notches 32 and intervening lands 33, of width identical to that of the notches, there being as many lands and notches in each cam as there are segments in each of the segment sets of the switching means 15. In the illustrated embodiment, the switching means 15 embodies twelve segments 22 and a like number of segments 22', while the cams 27 and 27' each embody six circumferentially spaced notches 32 and a like number of intervening lands 33.

From the foregoing it will be apparent that the cam following rollers 31 and 31' may be received successively in position engaging in the notches 32 and upon the lands 33 as the cams 27 and 27' are rotated. When the cam rollers 31 and 31' are received in the notches 32, the switches 26 and 26' will be in condition with the blades 29 thereof in electrical contact with the contact elements 28; but when the rollers 31 and 31' are supported on the lands 33, the blades 29 of the switches will be in electrical contact with the elements 28'. As the signal responsive apparatus 11 is moved by the adjusting means 10 from one adjusted position to the next adjacent position of adjustment, the cam 27 will be shifted with respect to the cam following roller 31 from a position in which the roller is received in a notch 32 to a position in which the roller is supported on a land 33, or vice versa.

In addition to the transmission line 13, a control cable 34 extends between the receiving station 12 and the remote connection station 14, said cable 34 embodying conductors 35 and 35', respectively interconnecting the contacts 28 and 28' of the switch 26 with the contacts 28' and 28 of the switch 26', and a conductor 36 which at the receiving station is connected with one side 37 of a power supply line, the other side 38 of which is electrically connected with the blade 29 of the switch 26, said blade and the conductor 36 being connected with the power supply line as through a master switch 39. At the remote connection station, the conductor 36 is connected with one side of the servo-motor 20, the opposite side of the motor being connected with the blade 29 of the switch 26'.

As a consequence, when the adjusting means 10 is operated to shift the apparatus 11 from one signal receiving position to another, the cam 27 will be shifted to move the roller 31 from a notch 32 onto a land 33, or from a land 33 into a notch 32, thereby shifting the blade 29 of the switch 26 from a position in engagement with one of the contact elements 28, 28', into engagement with the other of said elements, consequently completing a circuit through the servo-motor and both of the then closed contacts of the switches. Thus energized, the servo-motor will turn the switch means 15 from one circuit making position to the next adjacent switch position. At the same time, the motor will turn the cam 27' which will be shifted to move the roller 31' from a notch 32 onto a land 33, or from a land 33 into a notch 32, thereby shifting the blade 29 of the switch 26' from a position in engagement with one of the contact elements 28, 28' into engagement with the other of said elements, consequently breaking the circuit through the servo-motor.

As shown more particularly in FIGS. 1, 4 and 5, the adjusting mechanism 10 may comprise a pinion 40 driven periodically by a motor 41, which is also connected to adjust the signal responsive apparatus 11. Such a motor driven gear 40 is commonly provided in conventional multiple signal recorders of the sort shown in FIG. 5, for the purpose of driving a readily demountable selector switch mechanism 42 by means of which signaling circuits, like the circuits 16, may be directly connected in succession with the recording apparatus at the receiving station, said selector switch mechanism 42 being conventionally provided with a mounting bracket 43 adapted for attachment upon the frame of the recording apparatus in position to drivingly engage the selector switch mechanism with the motor driven selector switch driving gear of the apparatus.

The present invention contemplates the assembly of the switch 26 and the cam 27 upon a mounting plate 44 in the manner shown in FIG. 4 of the drawings, the cam 27 being mounted on a shaft 45 suitably journaled on the plate 44 adjacent an edge thereof, the switch 26 being secured on the plate, as by means of fastening bolts 46, in position to present the cam following roller 31 pressingly against the periphery of the cam 27. The shaft 45 may extend above the cam 27 in order to carry a gear wheel 47 in position to drivingly engage the motor driven gear 40 of the conventional apparatus 11, shown in FIG. 5, when the carrying plate 44 is attached thereon in place of the selector switch 42, the plate 44 along its edge adjacent the cam 27 and gear 47 being provided with an upstanding flange forming an attaching bracket 43' adapted for attachment upon the frame of the apparatus 11, in place of the selector switch mounting bracket 43. When so mounted the gear 47 will be drivingly engaged with the motor driven gear 40 of the apparatus 11. As shown in FIG. 4, the shaft 45 may be extended beneath the plate 44, that is to say, on the side thereof remote from the cam 27, and may carry a beveled gear 47' configurated to drivingly engage the motor driven gear of a multiple signal recording device other than that illustrated in FIG. 5. As a consequence, the same cam and switch assembly shown in FIG. 4 may be attached at will upon either of two different multiple signal recording devices.

As shown more particularly in FIG. 2, latching means 48 may be provided for locking the adjusting means 10 and the cam 27 of the master control mechanism 17, against movement until after the slave mechanism 18, including the servo-motor 20 and the switch control cam 27', shall have become stationary at the conclusion of a switch shifting cycle of operation. Such a latching facility is particularly useful where the adjusting means 10 is adapted for manual operation, since it will prevent such errors as might occur through careless manual operation of the adjusting means, as by turning the same in a reverse direction, or by accidentally moving the adjusting means through more than one adjustment step. As shown in FIG. 2, the adjusting means 10 may comprise a manually turnable knob or wheel 49 drivingly connected with the multiple signal receiving device 11, as through a gear box or train 50, said knob being also drivingly connected with the switch actuating cam 27 of the master control mechanism 17, as through a separable coupling 51, so that the switch 26 and its actuating cam 27 may be produced as an assembly unit, in the manner illustrated in FIG. 4, and detachably mounted in position to drivingly connect the cam 27 with the coupling 51.

A latching wheel 52 may be drivingly connected with the adjusting means 10 to turn in synchronism therewith, said wheel 52 preferably comprising a disk formed with a series of equally spaced latching perforations or notches 53 at and along the marginal edge of the disk, there being the same number of perforations or notches 53 in the latching wheel 52 as there are different switch positions of the switching means 15, so that the perforations or notches 53 each correspond with a matching circuit switching position of the controlled rotary switch 15. In order to prevent retrograde movement of the cam 27, as by reversely turning the knob 49, the latching wheel 52 may be provided with peripheral ratchet teeth 54 adapted to latchingly engage with a spring pressed pawl 55 to permit the latching wheel to be turned in one direction only.

As the adjusting mechanism 10 is operated, either manually as by means of the knob 49, or by periodically energized motor means of the sort shown at 41, in FIG. 1, the latching wheel 52 may be turned with the cam 27 to present the latching perforations or notches successively in alinement with a latch pin 56, as the cam 27 is turned successively into position to engage its notches 32 and lands 33 with the cooperating cam following roller 31. The latching pin 56 may be normally held in retracted position, as by means of a biasing spring 57, but may be projected, by operation of a pin projecting solenoid 58, from retracted position, against the contrary influence of the spring 57, into wheel latching engagement with whichever one of the latching perforations or notches 53 happens to be in alinement with the pin 56 when the solenoid 58 is energized. One end of the solenoid may be electrically connected with the side 37 of the power supply line, at the monitoring station, and the other end of the solenoid may be electrically connected with the blade 29 of the switch 26', at the remotely located switching station 14, said connection being made as through a conductor 59, which may be included in the cable 34 along with the conductors 35, 35' and 36. The solenoid 58 is thus connected in parallel relation with the switch driving servo-motor 20 and will be energized when and so long as the servo-motor is in switch actuating operation.

If desired, means may be provided for visually indicating, at the monitoring station, the adjusted position of the switching means 15, at the remote switching station. To this end, the adjusting means 10 may include a position indicating disk 60 drivingly connected to turn in step with the cam 27, the disk 60 being provided with position indicating numbers, or other suitable indicia, disposed in circumferentially spaced relationship at the edge of the disk, in position to be exposed through a viewing window 61, to thereby indicate the adjusted position of the cam 27 and consequently of the remotely located switching means 15.

Visual indicating means may also be provided at the monitoring station to indicate the performance of its switch shifting function by the servo-motor, at the remote switching station, thereby warning that the adjusting means 10 should not be operated until after the conclusion of the switch shifting cycle of the apparatus. To this end, a pilot or indicating lamp 63 may be connected in parallel with the solenoid 58, that is to say, in parallel with the servo-motor 20, so that the pilot light as well as the solenoid 58 will be energized when and so long as the servo-motor is in switch shifting operation; and the pilot or tell-tale lamp 63 may be displayed at the monitoring station behind a ruby lens or window 64 in order to provide a readily visible signal warning against the operation of the adjusting means 10 so long as the lamp 63 is energized. In an installation where the adjusting means 10 is motor driven, a motor disabling relay switch may be substituted for the pilot lamp 63 to prevent motor operation of the adjusting means 10 while and so long as the servo-motor 20 is engaged in performing its switch shifting function.

It is thought that the invention and its numerous attendant advantages will be fully understood from the foregoing description, and it is obvious that numerous changes may be made in the form, construction and arrangement of the several parts of the disclosed apparatus without departing from the spirit or scope of the invention, or sacrificing any of its attendant advantages, the forms herein disclosed being preferred embodiments for the purpose of demonstrating the invention.

The invention is hereby claimed as follows:

1. Control apparatus for successively connecting a plurality of remotely located circuits with a progressively adjustable instrumentality having associated movable adjusting means and located at a monitoring station, comprising a progressively operable rotary switch disposed at a switching station remote from said monitoring station, said switch having a plurality of circuit terminals for connection each with a corresponding one of said circuits and a turnable blade for electrical connection with said instrumentality, a pair of contactors respectively disposed at said switching and monitoring stations and each embodying a normally closed and a normally open switch and an associated switch actuating cam, a motor drivingly connected with the rotary switch and with the cam of the switching station contactor to drive the same in unison, to thereby shift the blade of the rotary switch into contact, successively, with its circuit terminals and to open and close the normally closed and open switches of the switching station contactor, while the blade of the rotary switch is in motion, means to turn the cam of the monitoring station contactor in unison with the adjusting movement of said instrumentality, to thereby open and close the normally closed and open switches of the monitoring station contactor, while the instrumentality is being adjusted, and means for connecting the normally closed switch of each contactor with the normally open switch of the other contactor and for connecting the motor with a source of motor energizing power, in series with said contactors.

2. Control apparatus as set forth in claim 1, including a latch and means operable with said motor to actuate the latch to secure the instrumentality and the cam driven in unison therewith against adjusting movement while the motor is in operation.

3. Control apparatus as set forth in claim 1, including a visual signal device energized at the monitoring station whenever the motor is in operation.

4. Control apparatus as set forth in claim 1, wherein the contactor actuating cams are identical discs having peripherally spaced notches, and intervening lands, and a cam follower shaped to engage the notches, when the switches of the associated contactor are in normal switching position, and to ride upon the lands to move the switches of the associated contactor from normal to shifted switching position.

5. Control apparatus for successively connecting a plurality of remotely located circuits with a progressively adjustable instrumentality having associated movable adjusting means and located at a monitoring station, comprising a progressively operable rotary switch disposed at a switching station remote from said monitoring station, said switch having a plurality of circuit terminals for connection each with a corresponding one of said circuits and a turnable blade for electrical connection with said instrumentality, a pair of contactors respectively disposed at said switching and monitoring stations and each embodying a normally closed and a normally open switch and an associated switch actuating cam, said cams comprising discs having peripherally spaced notches and intervening lands and a cam follower shaped to engage the notches when the switches of the associated contactor are in normal switching position, and to ride upon the lands to move the switches of the associated contactor from normal to shifted switching position, a motor drivingly connected with the rotary switch and with the cam of the switching station contactor to drive the same in unison, to thereby shift the blade of the rotary switch into contact, successively, with its circuit terminals and to shift the switching station contactor from normal to shifted switching position, while the blade of the rotary switch is in motion, means to turn the cam of the monitoring station contactor in unison with the adjusting movement of said instrumentality, to shift the monitoring station contactor from normal to shifted switching position, while the instrumentality is being adjusted, and means for connecting the normally closed switch of each contactor with the normally open switch of the other contactor and for connecting the motor with a source of motor energizing power, in series with said contactors.

6. Control apparatus as set forth in claim 5, wherein the contactors and their actuating cams are identical.

7. Control apparatus for successively connecting a plurality of remotely located circuits with a progressively adjustable instrumentality having associated movable adjusting means and located at a monitoring station, comprising means forming a connection circuit extending between the instrumentality at the monitoring station and said remotely located circuits, a progressively operable rotary switch disposed at a switching station remote from said monitoring station for connecting the circuits in sequence with said connection circuit, a slave motor drivingly connected with the rotary switch at said switching station, a motor control switch driven by said motor at the switching station, and a master control switch at the monitoring station and operable in synchronism with said adjusting means, and circuit forming means for connecting said master control switch with the motor control switch to control the operation of the slave motor and the switch driven thereby in step with the adjusting means.

8. Apparatus as set forth in claim 7, including turnable switch actuating means for actuating the master control switch, a gear for driving said switch actuating means, and a support frame carrying said master control switch, said switch acutuating means and said gear, said support frame being detachably mountable on said instrumentality in position to engage said gear with a driving pinion driven by said adjusting means.

9. Control apparatus for successively connecting a plurality of remotely located circuits with a progressively adjustable instrumentality having associated movable adjusting means and located at a monitoring station, comprising means forming a connection circuit extending between the instrumentality at the monitoring station and said remotely located circuits, a progressively operable rotary switch disposed at a switching station remote from said monitoring station for connecting the circuits in sequence with said connection circuit, a motor operable to turn the rotary switch progressively through its successive switching positions, a normally open and a normally closed contactor forming a pair of alternately closable slave motor control switches at the switching station, actuating means driven with the switch for opening the normally closed slave motor control contactor and for closing the normally open contactor as the rotary switch is moved from each of its switching positions to the next adjacent position, a normally open and a normally closed contactor forming a cooperating pair of alternately closable master motor control switches at the monitoring station, and means for connecting said pairs of control switches with said motor to form a pair of alternately operable motor energizing circuits each containing the normally open contactor of one pair of switches and the normally closed contactor of the other pair connected in series with the motor for delivering driving power to the motor alternately through said circuits, under the supervision of said control switches, and actuating means for closing an open one of said master control switches and for closing the other as the adjusting means is moved to set the instrumentality from one adjusted position to the next.

10. Apparatus as set forth in claim 9, wherein the master and slave control switches comprise identical single-pole, double-throw switching devices having their contact elements electrically connected together by conductors extending between the monitoring and switching stations, the pole of the master control switch being electrically connected with one side of a power supply line and the pole of the slave control switch being connected through the motor with the other side of the supply line.

11. Apparatus as set forth in claim 10, wherein the power supply line is located at one of said stations and a conductor connects one side of the line with the control apparatus at the other station.

12. Control apparatus for successively connecting a plurailty of remotely located circuits with a progressively adjustable instrumentality having associated movable adjusting means and located at a monitoring station, comprising means forming a connection circuit extending between the instrumentality at the monitoring station and said remotely located circuits, a progressively operable rotary switch disposed at a switching station remote from said monitoring station for connecting the circuits in sequence with said connection circuit, a slave motor operable to turn the rotary switch progressively through its successive switching positions, a single-pole, double-throw slave motor control switch at the switching station, a turnable cam for throwing said slave motor control switch from one switching position to the other as the rotary switch is moved from one switching position to the next adjacent position, a single-pole, double-throw master motor control switch, the poles of said control switches being interconnected with said motor and with a source of energizing power, and the contact elements of the control switches being electrically interconnected to form a pair of alternately operable motor energizing circuits each containing a contact element of each switch, said circuits being alternately connectible through the poles thereof in series with the motor for delivering driving power to the motor under the supervision of said control switches, and a turnable cam for throwing the master control switch from one switching position to the other as the adjusting means is moved to set the instrumentality from one adjusted position to the next.

References Cited by the Examiner

UNITED STATES PATENTS 2,657,376  10/53  McAdam _____ 340—187
2,888,624  5/59   Stover _____ 318—467

NEIL C. READ, *Primary Examiner.*

THOMAS B. HABECKER, *Examiner.*